Patented July 22, 1952

2,604,488

UNITED STATES PATENT OFFICE 2,604,488

PHENYL ESTER OF p-AMINOSALICYLIC ACID

Santiago Americano Freire, Belo Horizonte, Brazil, assignor to Societe des Usines Chimiques Rhone-Poulenc, Paris, France No Drawing. Application June 6, 1951, Serial No. 230,244. In France June 14, 1950

2 Claims. (Cl. 260—471)

This invention relates to a new ester of p-aminosalicylic acid and has for one of its objects to provide a new ester of this acid which unexpectedly exhibits therapeutic advantage over the acid and the known esters thereof. A further object of this invention is to provide a new such ester which possesses in the treatment of certain tubercular conditions a superiority over p-aminosalicylic acid and over streptomycin at equal dosage levels. A still further object of this invention is to provide a commercially satisfactory process for preparing such new ester.

It has now been found that the new ester, 2-hydroxy-4-aminophenylbenzoate of the formula:

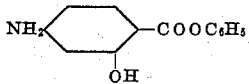

possesses useful therapeutic properties. In experiments in vitro on the Koch bacillus strain H37Rv, this substance has been demonstrated to be markedly more active than other esters of p-aminosalicylic acid already known and also p-aminosalicylic acid itself. In vivo in the treatment of experimental tuberculosis it has been shown to be superior to p-aminosalicylic acid used in the same dosage and to streptomycin.

This new product may be prepared, according to a feature of the invention, by esterification of 2-hydroxy-4-nitrobenzoic acid with phenol in the presence of phosphorus oxychloride, followed by catalytic reduction of the 2-hydroxy-4-nitrophenylbenzoate thus obtained with hydrogen in the presence of Raney nickel catalyst.

The following, non-limitative example illustrates the preparation of the new ester of the invention.

Example 183 g. of p-nitrosalicylic acid are dissolved in 564 g. of phenol by heating to 140–150° C. on an oil bath. When all the p-nitrosalicylic acid is dissolved, 153 g. of phosphorus oxychloride are run in, drop by drop, over a period of about 2 hours, while maintaining the temperature at about 150° C. The still warm mixture is run into 2 litres of water with agitation. The precipitate formed is filtered off, washed with water until phenol is removed and then dried.

There are thus obtained 250 g. of 2-hydroxy-4-nitrophenylbenzoate which melts at 154–155° C.

In a hydrogenation autoclave are introduced 92 g. of 2-hydroxy-4-nitrophenylbenzoate preceded by 200 c. c. of ethyl acetate; Raney nickel, obtained from 30 g. of alloy, is added with 300 c. c. of ethyl acetate. Hydrogenation under pressure (100–120 kg.) at ordinary temperature is carried out during a period of about 12 hours. The nickel is filtered off and the ethyl acetate is removed by distillation on the water bath under a vacuum of 300 mm. There is thus obtained 80 g. of crude damp 2-hydroxy-4-aminophenylbenzoate which after recrystallisation from isopropyl alcohol melts at 153° C.

I claim:

1. Phenyl-2-hydroxy-4-aminobenzoate having the structural formula:

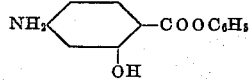

2. A process for the preparation of a new therapeutically useful ester of p-aminosalicylic acid of the formula:

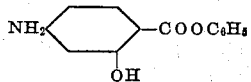

which comprises heating 2-hydroxy-4-nitro benzoic acid with phenol in the presence of phosphorus oxychloride and treating the product obtained with hydrogen under pressure in the presence of Raney nickel.

SANTIAGO AMERICANO FREIRE.

No references cited.